(12) United States Patent
Sotomayor et al.

(10) Patent No.: US 11,224,004 B2
(45) Date of Patent: **\*Jan. 11, 2022**

(54) SYSTEM AND METHOD OF TRACKING A MOBILE DEVICE

(71) Applicant: TRESPASS TRACKER LTD., Guelph (CA)

(72) Inventors: Joel Roberto Sotomayor, Guelph (CA); Idris Soule Alaofe, Hamilton (CA)

(73) Assignee: TRESPASS TRACKER LTD., Guelph (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,733

(22) Filed: Sep. 21, 2020

(65) Prior Publication Data

US 2021/0084570 A1    Mar. 18, 2021

Related U.S. Application Data

(63) Continuation of application No. 16/569,180, filed on Sep. 12, 2019, now Pat. No. 10,785,708.

(Continued)

(51) Int. Cl.
*H04W 48/04*    (2009.01)
*H04W 12/12*    (2021.01)
(Continued)

(52) U.S. Cl.
CPC .......... *H04W 48/10* (2013.01); *H04W 4/029* (2018.02); *H04W 8/02* (2013.01); *H04W 8/18* (2013.01); *H04W 48/16* (2013.01); *H04W 60/00* (2013.01)

(58) Field of Classification Search
CPC ..... H04W 48/10; H04W 48/04; H04W 60/00; H04W 12/12; H04W 12/35; H04W 4/021;
(Continued)

(56) References Cited

U.S. PATENT DOCUMENTS 6,442,392 B2    8/2002    Ruutu
6,810,250 B2    10/2004    Jo
(Continued)

FOREIGN PATENT DOCUMENTS

CA    2815310 C    * 12/2016
EP    2672744 A1    * 12/2013

OTHER PUBLICATIONS

Attacking the baseband modem of mobile phones to breach the users' privacy and network security by Christos Xenakis; Christoforos Ntantogian Published in: 2015 7th International Conference on Cyber Conflict: Architectures in Cyberspace Jul. 2015 ( Year: 2015).*

(Continued)

*Primary Examiner* — William D Cumming
(74) *Attorney, Agent, or Firm* — Norton Rose Fulbright Canada LLP

(57) ABSTRACT

Systems and methods for tracking mobile devices are provided. One system comprises at least one processor and memory storing code which when executed by the at least one processor configure the at least one processor to perform a method of tracking a mobile device. The method comprises receiving broadcasting an IMSI message, receiving an IMSI attach request message from a mobile device, and identifying the mobile device within a location area.

20 Claims, 7 Drawing Sheets

Related U.S. Application Data

(60) Provisional application No. 62/730,287, filed on Sep. 12, 2018.

(51) Int. Cl.
| | | |
|---|---|---|
| *H04W 4/24* | (2018.01) | |
| *H04W 4/60* | (2018.01) | |
| *H04W 8/18* | (2009.01) | |
| *H04W 48/10* | (2009.01) | |
| *H04W 4/029* | (2018.01) | |
| *H04W 48/16* | (2009.01) | |
| *H04W 60/00* | (2009.01) | |
| *H04W 8/02* | (2009.01) | |

(58) Field of Classification Search
CPC ........... H04W 4/24; H04W 4/29; H04W 4/60; H04W 8/18
USPC ................ 455/410, 432.1, 456.4, 406, 456.2
See application file for complete search history.

(56) References Cited

U.S. PATENT DOCUMENTS

| | | | |
|---|---|---|---|
| 7,280,826 B2 | 10/2007 | Nylander | |
| 8,326,268 B2 | 12/2012 | Ahn | |
| 8,463,297 B2 * | 6/2013 | Bull | H04W 4/021 |
| | | | 455/456.4 |
| 8,818,331 B2 * | 8/2014 | Mohammed | H04W 4/24 |
| | | | 455/406 |
| 8,958,773 B2 * | 2/2015 | Mohammed | H04M 15/58 |
| | | | 455/406 |
| 9,055,518 B2 | 6/2015 | Vainola | |
| 9,736,689 B2 * | 8/2017 | Liu | H04W 12/35 |
| 9,749,929 B2 | 8/2017 | Chong | |
| 9,860,834 B2 | 1/2018 | Kim | |
| 9,911,103 B2 | 3/2018 | Hodges | |
| 9,918,298 B2 | 3/2018 | Yu | |
| 10,098,019 B2 | 10/2018 | Martin | |
| 10,117,122 B2 | 10/2018 | Martin | |
| 10,462,684 B2 | 10/2019 | Martin | |
| 10,630,410 B2 * | 4/2020 | Parkvall | H04L 29/06231 |
| 10,638,253 B1 * | 4/2020 | Parkvall | H04B 7/0848 |
| 10,785,708 B2 * | 9/2020 | Soule Alaofe | H04W 48/10 |
| 2002/0061746 A1 | 5/2002 | Jo | |
| 2009/0170528 A1 * | 7/2009 | Bull | H04W 48/04 |
| | | | 455/456.2 |
| 2009/0305668 A1 * | 12/2009 | Ahn | H04W 12/12 |
| | | | 455/410 |
| 2012/0095905 A1 | 4/2012 | Hodges | |
| 2012/0208532 A1 * | 8/2012 | Liu | H04W 12/35 |
| | | | 455/432.1 |
| 2012/0264466 A1 | 10/2012 | Vainola | |
| 2014/0199962 A1 * | 7/2014 | Mohammed | H04W 4/60 |
| | | | 455/406 |
| 2014/0357222 A1 * | 12/2014 | Mohammed | H04M 15/8033 |
| | | | 455/406 |
| 2016/0219503 A1 | 7/2016 | Kim | |
| 2016/0286523 A1 | 9/2016 | Yu | |
| 2017/0201925 A1 | 7/2017 | Chong | |
| 2017/0311195 A1 | 10/2017 | Martin | |
| 2017/0331577 A1 * | 11/2017 | Parkvall | H04W 8/18 |
| 2017/0339580 A1 | 11/2017 | Martin | |
| 2018/0035295 A1 * | 2/2018 | Liu | H04L 63/0853 |
| 2018/0160291 A1 | 6/2018 | Burgert | |
| 2019/0021014 A1 | 1/2019 | Martin | |
| 2019/0037431 A1 | 1/2019 | Martin | |
| 2020/0084701 A1 * | 3/2020 | Soule Alaofe | H04W 4/029 |
| 2020/0120482 A1 * | 4/2020 | Parkvall | H04B 7/0848 |
| 2020/0236549 A1 * | 7/2020 | Liu | H04W 12/35 |

OTHER PUBLICATIONS

Investigating GSM Control Channels with RTL-SDR and GNU Radio by Deepak Vohra; Arusha Dubey; Khyati Vachhhani Published in: 2016 International Conference on Wireless Communications, Signal Processing and Networking (WiSPNET) Sep. 2016 ( Year: 2016).*

Office Action issued in U.S. Appl. No. 16/569,180 dated Feb. 10, 2020.

Notice of Allowace issued in U.S. Appl. No. 16/569,180 dated May 15, 2020.

International Search Report + Written Opinion issued in PCT/CA2020/051227 dated Oct. 22, 2020.

* cited by examiner

SYSTEM AND METHOD OF TRACKING A MOBILE DEVICE

CROSS REFERENCE TO RELATED APPLICATIONS

This application is a continuation of U.S. patent application Ser. No. 16/569,180 filed Sep. 12, 2019, which claims the benefit of U.S. Provisional Patent Application No. 62/730,287 filed Sep. 12, 2018, all of which are herein incorporated by reference in their entirety.

FIELD

The present disclosure generally relates to tracking devices, and in particular to a system and method of tracking a mobile device.

INTRODUCTION

Unauthorized individuals may attempt to enter a premises. It is desirable to be able to track individuals that attempt to enter a premises.

SUMMARY

In accordance with an aspect, there is provided a system for tracking a mobile device. The system comprises a processor and memory storing code which when executed by the processor configure the processor to broadcast an international mobile subscriber identity (IMSI) message; receive an IMSI attach request message from a mobile device, and identify the mobile device within a location area.

In accordance with another aspect, there is provided a method for tracking a mobile device. The method comprises broadcasting an IMSI message, receiving an IMSI attach request message from a mobile device, and identifying the mobile device within a location area.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings.

The Third Generation Partnership Project (3GPP) specification for Layers 2 & 3 of the Global Systems for Mobile communication (GSM) protocol may be loose in specific sections—causing network operators to have implementation deficiencies. These built-in differences and deficiencies allow for surface layer identification and passive tracking. Intruders or trespassers may be passively tracked and identified on varying properties through the use of GSM signals emitted by their cellular devices. In some embodiments, a software-defined radio (SDR) may be developed to track such cellular devices. An SDR may comprise hardware, which is able to receive (listen) to the frequencies in the GSM band, coupled with in-house algorithms implemented in software to make sense of the data.

Before a capture can take place, a hardware device may be used to channel in the GSM frequencies from the radio-link through an Um interface. The hardware device may be configured to detect GSM and Long-Term Evolution (LTE) frequencies. In some embodiment, a hardware system may be used to connect with the Um interface. In some embodiments, an SDR may be used to connect with the Um interface, where the tuning functionality is implemented in software. This SDR may be coupled with an Omni-directional antennae to feed into a monitoring system.

Figure 1:
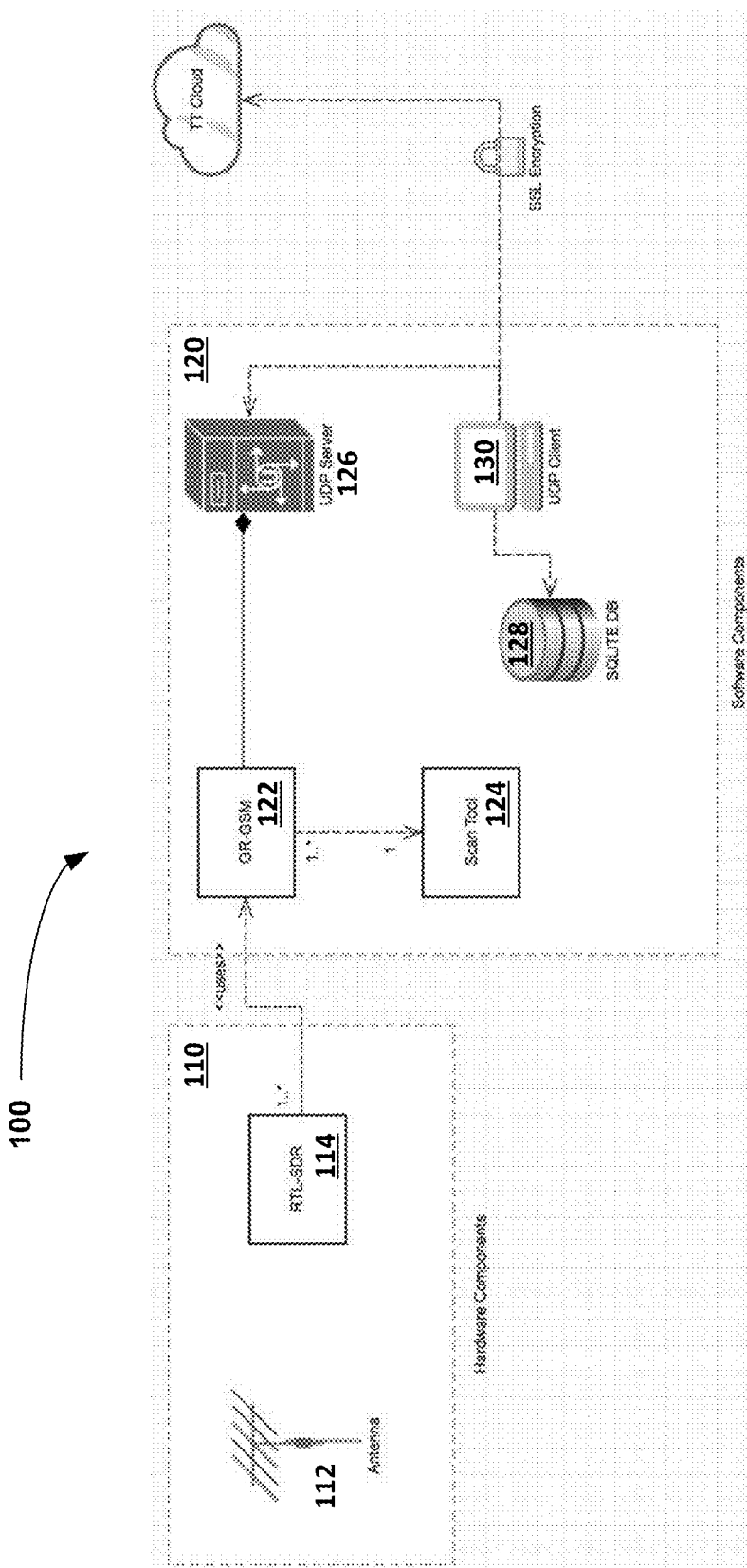
FIG. 1 illustrates, in a schematic diagram, an example of a tracking system architecture, in accordance with some embodiments.

FIG. 1 illustrates, in a schematic diagram, an example of a device tracking system 100 architecture, in accordance with some embodiments. The system 100 includes hardware (HW) 110 and software (SW) 120 components. The hardware components 110 include an antenna 112 and a register-transfer level (RTL)-SDR device 114. The software components 120 include a GR-GSM 122 module, a scan tool 124, a user datagram protocol (UDP) server 126, a database 128 and a UDP client 130.

Figure 2:
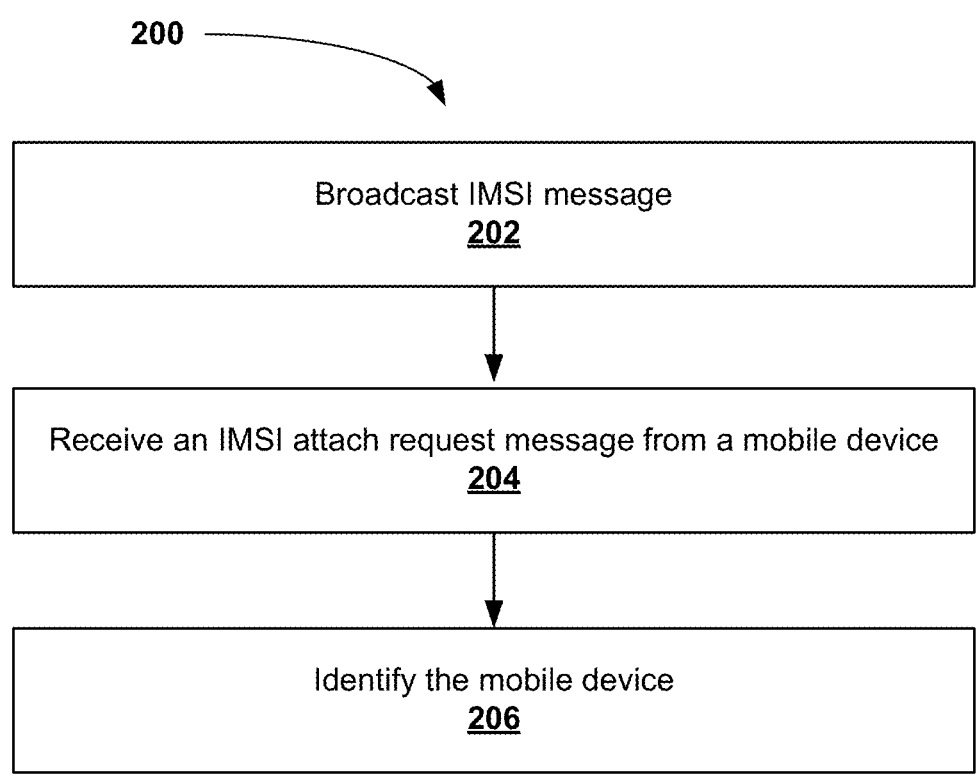
FIG. 2 illustrates, in a flowchart, an example of a method of tracking a mobile device, in accordance with some embodiments.

FIG. 2 illustrates, in a flowchart, an example of a method 200 of tracking a mobile device, in accordance with some embodiments. The method comprises broadcasting 202 an IMSI message, receiving 204 an IMSI attach request message from a mobile device, and identifying 206 the mobile device. Other steps may be added to the method 200.

In addition to the RTL-SDR 114 hardware, there is functionality to listen to Bluetooth™ Low Energy (BLE) packets (e.g., in sniff mode), which has the dual functionality of identifying "friendlies" and intruders alike. The use case presented herein includes a BLE card that can be sensed on the premises to determine if employees have entered a particular region. As will be detailed further below, this can also aid in distinguishing intruders from those who can legally enter, or have the right be on, the premises.

The software 120 in the system 100 may route, dissect and perform stateful inspection of GSM/LTE packets. The system 100 may be used to determine who (generically) is on the property, and approximately (to produce an n-sigma distance—statistically) where they are. Since the 3GGP standard leaves implementation dependent behavior, this allows the system 100 leeway from the GSM perspective of stateful inspection. A principle of cellular communication is the ability to identify a mobile station (MS) on the serial number (SN). The international mobile subscriber identity (IMSI) is a component that provides for unique identification. Due to security concerns, the IMSI rarely broadcasts. As a result the temporary mobile subscriber identity (TMSI)/Packet (P)-TMSI and the global unique temporary identifier (GUTI) (i.e., for LTE/Fourth Generation (4G)) is broadcast. It should be noted that these replacements for the IMSI are randomly generated and in some cases use a uniform distribution. They are 32-bits long and can take on any value from the set over which 32-bits (unsigned) are defined except for 0xFFFFFFFF (used for subscriber identity module (SIM)). For a given location area code (LAC) and MSs in the area, regeneration of the same TMSI/P-TMSI/GUTI (herein referred to as TMSI) is not likely. This problem then becomes random sampling on U for size $X=2^{32}-1$ and sample size Y (i.e., the Birthday Problem). For example:

$$P(Z(i))=P(N(i)\leq 1)=(1-X^{-1})^Y+Y(1-X^{-1})^{Y-1}(1/X)$$

where Z(i) is 1 when there is another TMSI duplicated from [0,U] exclusive of the special value 0xFFFFFFFF, and 0 otherwise. Then, the equation may be equally derived for the expected value for a collision with Y samples. Trivially, it is as follows:

$$E(\text{collisions})=Y+X(1-X^{-1})^Y-X$$

which works such that Y MSs would have the possibility to have at most Y collisions. Considering that $1/2^{32}-1$ is near 10 billionths, the likelihood function would work out that this is near impossible and high improbable. Given 330 million people in the US all located in the same LAC (if it was even theoretically possible) would still prove the likelihood would be low (e.g., 7.69%). Thus, for sufficiently small Y the likelihood drastically rolls off logarithmically.

Figure 3:
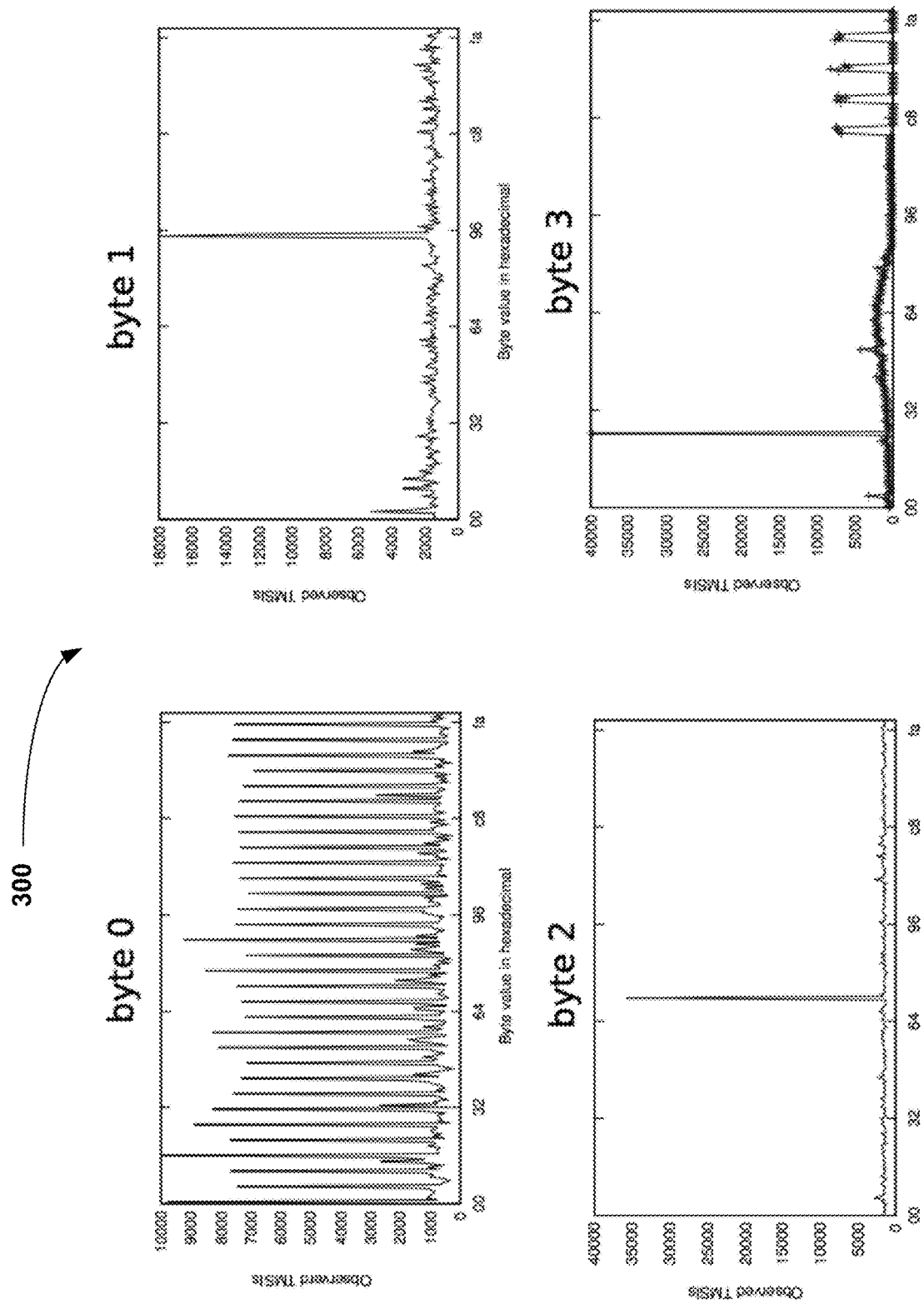
FIG. 3 illustrates, in plot diagrams, temporary mobile subscriber identity (TMSI) distribution of mobile devices serial numbers (SNs) in Europe.

This may then provide confidence to an algorithm that once a TMSI is obtained, it belongs to a particular MS for the given session in the specific LAC in which the system 100 is listening. FIG. 3 illustrates, in plot diagrams, this TMSI distribution of mobile device serial SNs in Europe 300. As can be seen in the plot diagrams, the distribution is fairly even with the exception of a few points. Therefore, the likelihood of a mobile device to have the same TMSI as another mobile device is very low.

Internally, the system 100 core may comprise stateful GSM packet inspection using a Finite Automaton. Times as to when IMSIs and TMSIs are broadcast through this inspection along with the 3GPP protocol specification may be identified:
1. MS is in MS::IDLE state just entering an LA
2. MS is moving between two LAs
3. Paging Request (All types) in an LA
4. Location Update (Normal, Periodic, IMSI Attach)
5. Phone Switched Off (IMSI Detach)
6. CM Service Request (SMS, Broadcast)

The following outlines various software proposed solutions to handle these cases and sub-cases for the GSM case.

For a Finite State Machine (FSM) this initially would be the first state. MSs that come into the location area (LA) through various means could be marked: cellular switched on, SIM inserted, or network coverage restored. This case is unique in that an MS will reach to the visitor location register (VLR). However, there are multiple cases, especially in remote areas, where the VLR is either down temporarily, low in static-ram or not available, causing a hit to the home location register (HLR) and forcing the IMSI to be sent. Other cases such as a normal update where are pull from the VLR without HLR intervention still sends the IMSI (most likely the case is that VLRs internal cache was cleared) as seen, in the example of a GSM packet structure, below:

▼ GSM A-I/F DTAP—Location Updating Request
  ▼ Protocol Discriminator: Mobility Management messages (5)
    . . . 0101=Protocol discriminator: Mobility Management messages (0x5)
    0000 . . . =Skip Indicator: No indication of selected PLMN (0)
    00 . . . =Sequence number: 0
    . . . 00 1000=DTAP Mobility Management Message Type: Location Updating Request (0x08)
  Ciphering Key Sequence Number
  ▼ Location Updating Type—Normal
    . . . 0 . . . =Follow-On Request (FOR): No follow-on request pending
    . . . 0 . . . =Spare bit(s): 0
    . . . 00=Updating Type: Normal (0)
  Location Area Identification (LAI)
▼ Mobile Station Classmark 1
▼ Mobile Station Classmark 1
  0 . . . =Spare: 0
  .10 . . . =Revision Level: Used by mobile stations supporting R99 or later versions of the protocol (2)
  . . . 1 . . . =ES IND: Controlled Early Classmark Sending option is implemented in the MS
  . . . 0 . . . =A5/1 algorithm supported: encryption algorithm A5/1 available
  . . . 011=RF Power Capability: class 4 (3)
▼ Mobile Identity—IMSI (310410530578733)
  Length: 8
  0011 . . . =Identity Digit 1: 3
  . . . 1 . . . =Odd/even indication: Odd number of identity digits
  . . . 001=Mobile Identity Type: IMSI (1)
▼ IMSI: 310410530578733
  Mobile Country Code (MCC): United States (310)
  Mobile Network Code (MNC): AT&T Mobility (410)

Now the ability to link an IMSI to a unique identifier in the system 100 can be made. Furthermore, should the MS remain on a particular property in the LA once location updates happen (i.e., if the network operator has opted to follow specification) then multiple TMSIs (e.g., once every 24 minutes) may be tied to an IMSI for the given session.

Two operations of system 100 implemented in software allow for the matching of an IMSI to a TMSI upon receipt of an IMSI Attach message by the system 100 and passively tracking an MS through a complex set of sub-states via a Location Update GSM Procedure. An internal Finite State Machine will start off in the IMSI Attach state of which the system 100 will then wait for messages that match the state and use the database for insert, deletion and retrieval of MS related (meta)data based on packet analysis.

Figure 4:
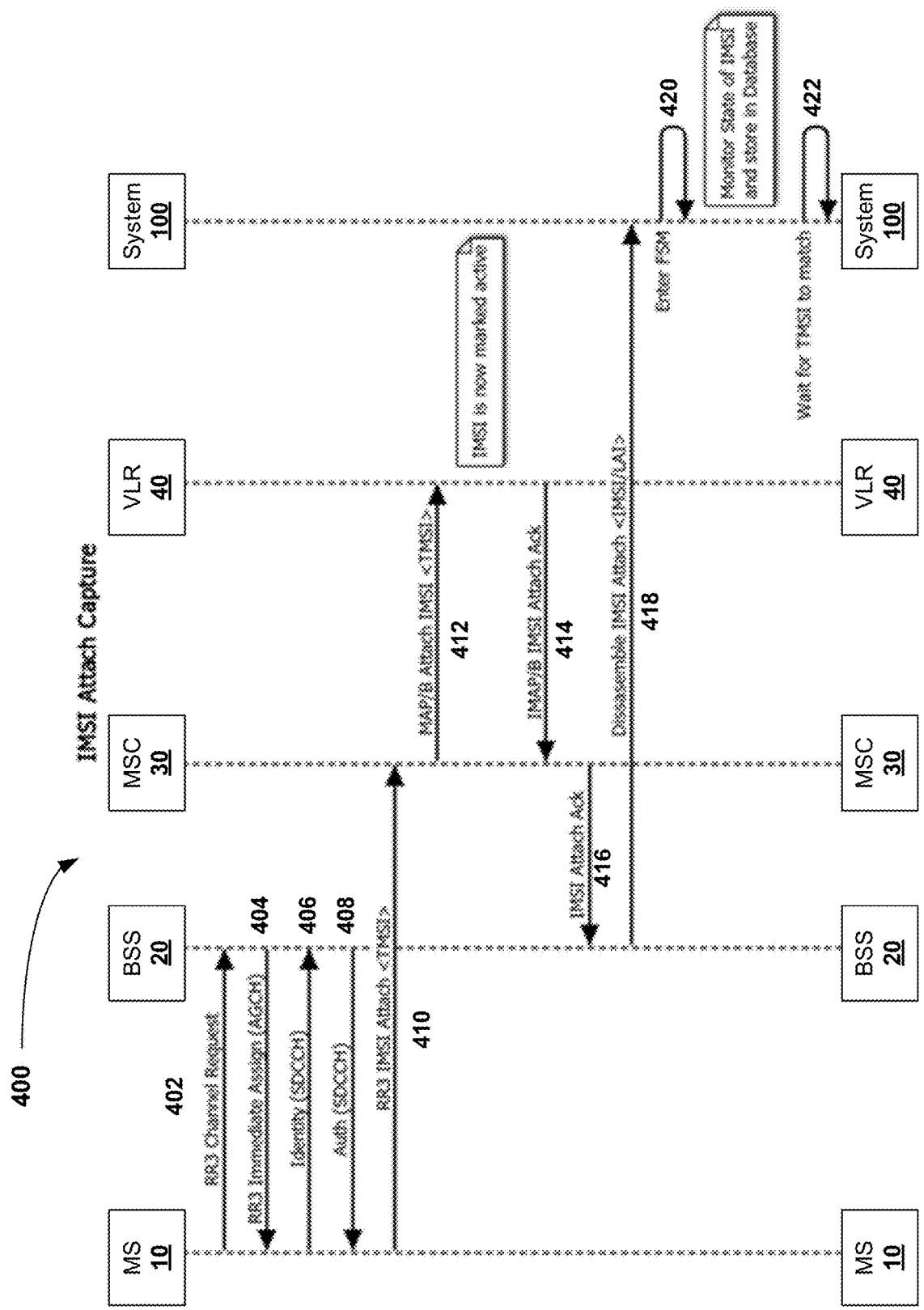
FIG. 4 illustrates, in a sequence diagram, an example of a method of the interception of a message showing an international mobile subscriber identity (IMSI) Attach capture, in accordance with some embodiments.

FIG. 4 illustrates, in a sequence diagram, an example of a method 400 of the interception of a message showing an IMSI Attach capture, in accordance with some embodiments. The method 400 comprises a MS 10 sending a RR3 Channel Request message 402 to a base station (BSS) 20.

The BSS 20 sends a RR3 Immediate Assign (AGCH) message 404 to the MS 10. Next, the MS 10 sends an Identity (SDCCH) message 406 to the BSS 20. The BSS 20 sends an Auth (SDCCH) message 408 to the MS 10. Next, the MS 10 sends a RR3 IMSI Attach <TMSI> message 410 to a mobile station centre (MSC) 30. The MSC 30 then sends a MAP/B Attach IMSI <TMSI> message 412 to a visitor location register (VLR) 40. The IMSI may be marked as active. The VLR 40 sends an IMAP/B IMSI Attach Ack message 414 to the MSC 30. The MSC 30 then sends an IMSI Attach Ack message 416 to the BSS 20. The BSS 20 sends a Disassemble IMSI Attach <IMSI/LAI> message 418 to the system 100. The system 100 enters 420 a finite state machine (FSM) where the system 100 monitors the state of the IMSI and stores it in the database 128. The system 100 then waits 422 for a matching TMSI.

System 100, for a majority of the time, will execute in the Location Updating State and the three sub-states: normal, IMSI Attach and periodic (with Timer T3212). Moreover, a majority of the passive tracking and geolocation position awareness will happen through these sub-states. Initially a message will trigger this state (particularly if the MS is already registered in the system 100 database).

Figure 5:
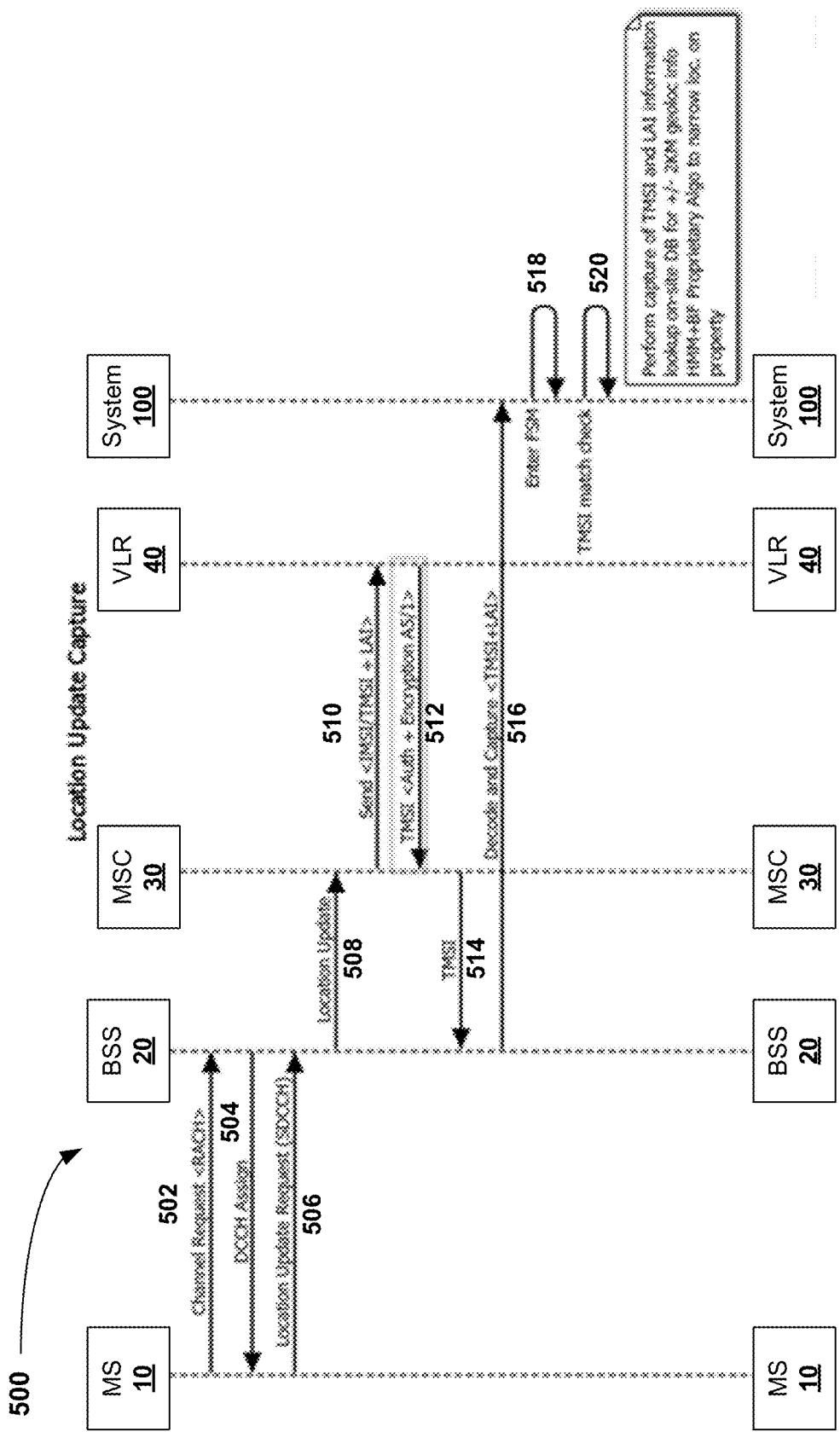
FIG. 5 illustrates, in a sequence diagram, an example of a method of a location update capture, in accordance with some embodiments.

FIG. 5 illustrates, in a sequence diagram, an example of a method 500 of a location update capture, in accordance with some embodiments. The method 500 comprises the MS 10 sending a Channel Request <RACH> message 502 to the BSS 20. The BSS 20 sends a DCCH Assign message 504 to the MS 10. The MS 10 then sends a Location Update Requst (SDCCH) message 506 to the BSS 20. The BSS 20 sends a Location Update message 508 to the MSC 30. The MSC 30 sends a Send <IMSI/TMSI+LAI> message 510 to the VLR 40. The VLR 40 sends a TMSI <Auth+Encryption A5/1> message to the MSC 30. The MSC 30 then sends 514 the TMSI to the BSS 20. The BSS 20 sends a Decode and Capture <TMSI+LAI> message to the system 100. The system 100 enters 518 FSM and checks 520 for a TMSI match. The system 100 performs the capture of TMSI and LAI information lookup using an on-site database (DB) 128 for +/−2 km geolocation information. Upon TMSI match checking, the application of a Hidden Markov Model (HMM) and Bayesian Filter (BF) may be used to improve distance and location trajectory calculations, consequently narrowing a 2 km distance to a value around approximately 500 m (centered at the antenna) at most dependent on terrain and antennae properties.

Figure 6:
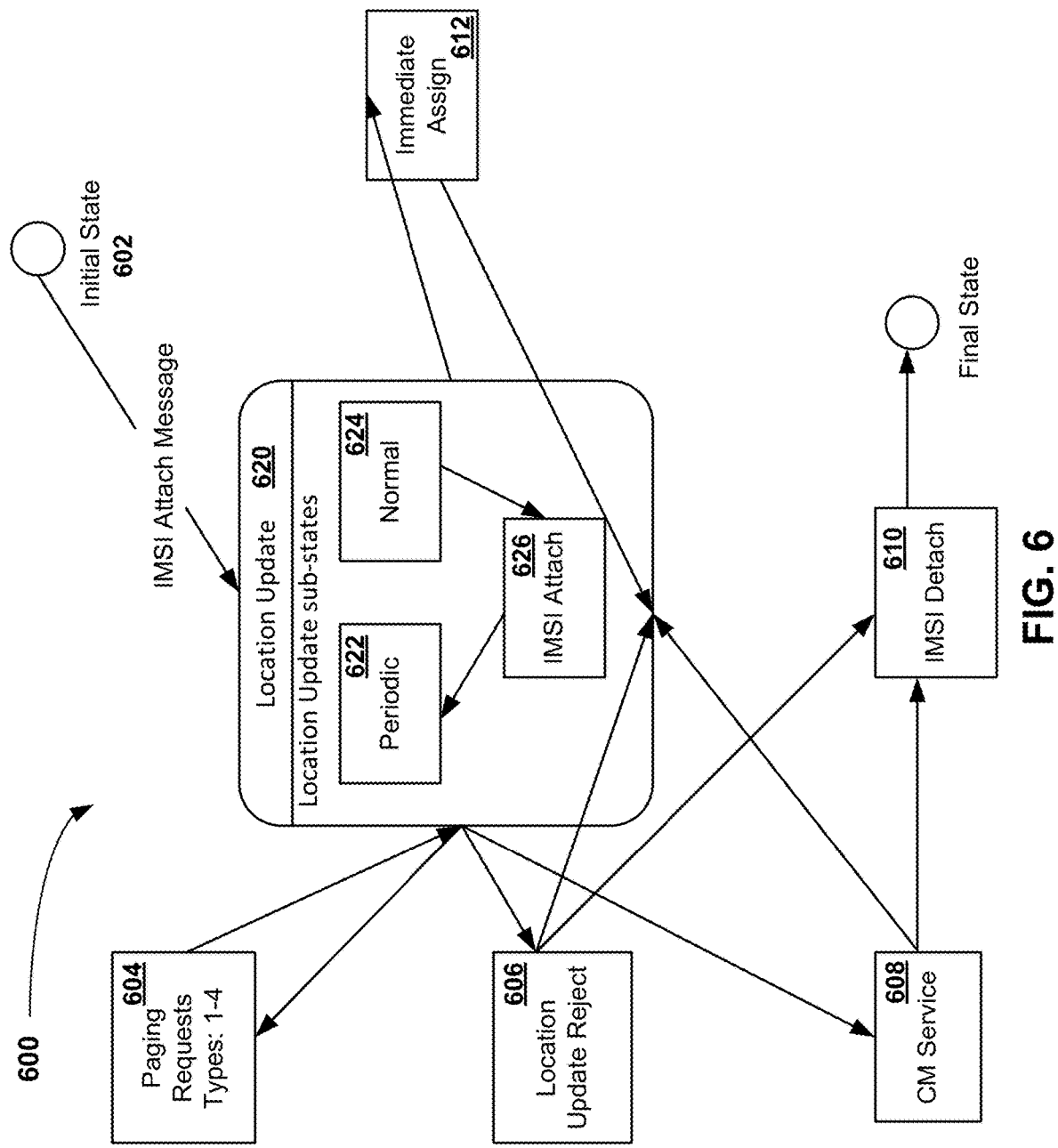
FIG. 6 illustrates, in a state transition diagram, an example of a state interaction for Global Systems for Mobile communication (GSM) packets as captured in a Finite State Machine (FSM), in accordance with some embodiments.

FIG. 6 illustrates, in a state transition diagram, an example of a state interaction 600 for GSM packets as captured in a FSM, in accordance with some embodiments. The states shown include an initial state 602, a paging requests types state 604, a location update reject state 606, a CM service state 608, an IMSI detach state 610, an immediate assign state 612 and a location update state 620. The location update state includes a periodic sub-state 622, a normal sub-state 624 and a IMSI attach sub-state 626. The initial state 602 reflects a MS on a property as seen in an IMSI Attach message. The device (MS) may transition to any of the states. During a state transition to a location update state, the HMM and BF system may determine a location of the device. The state interaction 600 may then be inputted into a machine learning (ML) algorithm for position determination.

In some embodiments, the system 100, can also listen to BL devices. In cases where users are given name Identification Cards with a picture of themselves on the card, a Bluetooth™ device may be attached to the ID card which can be picked up by the system 100 platform. The identity of the person may be confirmed if the person's picture on the ID card is the same by showing a picture of the person on the computer. Also, since there are instances in agriculture where individuals are allowed to enter properties after a given period (quarantine period), the system 100 can be used to enforce these rules.

The system 100 can be used as a method of disease traceability for individuals who often visit farm premises and maybe vectors of disease spread. Since the system 100 can be used by many farmers, it is possible that if a farmer is part of an association, then that association group can create a network of movements. This would make it possible to identify phone characteristics and track a mobile phone as it moves around farm properties.

This type of movement tracking can also be applied outside of agriculture and applied to other sectors such as in mining facilities, personal cottages, and other sectors which require an intrusion detection system where assets are expensive.

Figure 7:
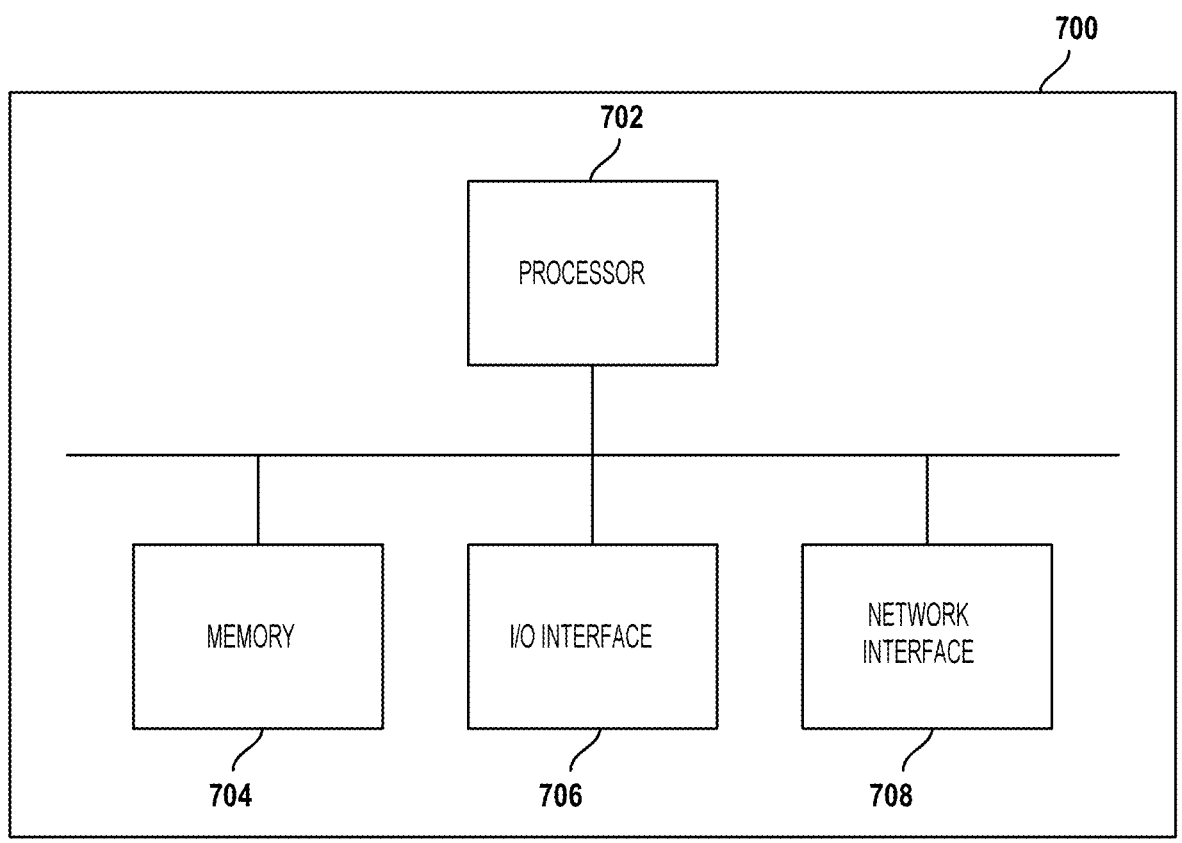
FIG. 7 is a schematic diagram of a computing device such as a server.

FIG. 7 is a schematic diagram of a computing device 700 such as a server. As depicted, the computing device includes at least one processor 702, memory 704, at least one I/O interface 706, and at least one network interface 708.

Processor 702 may be an Intel or AMD x86 or x64, PowerPC, ARM processor, or the like. Memory 704 may include a suitable combination of computer memory that is located either internally or externally such as, for example, random-access memory (RAM), read-only memory (ROM), compact disc read-only memory (CDROM).

Each I/O interface 706 enables computing device 700 to interconnect with one or more input devices, such as a keyboard, mouse, camera, touch screen and a microphone, or with one or more output devices such as a display screen and a speaker.

Each network interface 708 enables computing device 700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The foregoing discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

The invention claimed is:

1. A system for tracking mobile devices, the system comprising at least one processor and memory storing code which when executed by the at least one processor configure the at least one processor to:
store in a database an active international mobile subscriber identity (IMSI) for an identified mobile device located within a location area;
receive a decode and capture message from the base station, the decode and capture message including a temporary mobile subscriber identity (TMSI) and location area identification (LAI) associated with an unidentified mobile device; and
identify the unidentified mobile device as being the identified mobile device within the location area.

2. The system as claimed in claim 1, wherein to identify the unidentified mobile device, the at least one processor is configured to:
enter a finite state mode;
monitor a location update state of the IMSI, the location update state comprising one of:
a location update normal state;
a location update IMSI attach state; and
a location update periodic state; and
identify a location update state associated with the TMSI as matching a location update state associated with the IMSI.

3. The system as claimed in claim 2, wherein the at least one processor is configured to:
determine that the mobile device associated with the IMSI is still within the location area.

4. The system as claimed in claim 1, wherein the at least one processor is configured to:
apply a hidden markov model and bayesian filter to narrow the location area.

5. The system as claimed in claim 1, wherein the at least one processor is configured to:
periodically monitor the location of the identified mobile device by receiving periodic decode and capture messages for non-identified mobile devices from the base station.

6. The system as claimed in claim 1, wherein the at least one processor is configured to:
store IMSI location update state information; and
probabilistically compare TMSI location update state information with the stored IMSI location update state information.

7. A method of tracking mobile devices, the method comprising:
storing in a database an active international mobile subscriber identity (IMSI) for an identified mobile device located within a location area;
receiving a decode and capture message from the base station, the decode and capture message including a temporary mobile subscriber identity (TMSI) and location area identification (LAI) associated with an unidentified mobile device; and
identifying the unidentified mobile device as being the identified mobile device within the location area.

8. The method as claimed in claim 7, comprising:
entering a finite state mode;
monitoring a location update state of the IMSI, the location update state comprising one of:
a location update normal state;
a location update IMSI attach state; and
a location update periodic state; and
identifying a location update state associated with the TMSI as matching a location update state associated with the IMSI.

9. The method as claimed in claim 8, comprising determining that the mobile device associated with the IMSI is still within the location area.

10. The method as claimed in claim 7, comprising:
applying a hidden markov model and bayesian filter to narrow the location area.

11. The method as claimed in claim 7, comprising:
periodically monitoring the location of the identified mobile device by receiving periodic decode and capture messages for non-identified mobile devices from the base station.

12. The method as claimed in claim 7, comprising:
storing IMSI location update state information; and
probabilistically comparing TMSI location update state information with the stored IMSI location update state information.

13. A system for tracking mobile devices, the system comprising at least one processor and memory storing code which when executed by the at least one processor configure the at least one processor to:

store in a database an active international mobile subscriber identity (IMSI) for an identified mobile device located within a location area;
receive a decode and capture message from the base station, the decode and capture message including a temporary mobile subscriber identity (TMSI) and location area identity (LAI) associated with an unidentified mobile device; and
enter a finite state mode;
monitor a location update state of the IMSI, the location update state comprising one of:
a location update normal state;
a location update IMSI attach state; and
a location update periodic state; and
identifying a location update state associated with the TMSI as matching a location update state associated with the IMSI.

14. The system as claimed in claim 13, wherein the at least one processor is configured to:
determine that the mobile device associated with the IMSI is still within the location area.

15. The system as claimed in claim 14, wherein the at least one processor is configured to:
apply a hidden markov model and bayesian filter to narrow the location area.

16. The system as claimed in claim 15, wherein the at least one processor is configured to:
store IMSI location update state information;
probabilistically compare TMSI location update state information with the stored IMSI location update state information; and
periodically monitor the location of the identified mobile device by receiving periodic decode and capture messages for non-identified mobile devices from the base station.

17. A method for tracking mobile devices, the method comprising:
store in a database an active international mobile subscriber identity (IMSI) for an identified mobile device located within a location area;
receiving a decode and capture message from the base station, the decode and capture message including a temporary mobile subscriber identity (TMSI) and location area identification (LAI) associated with an unidentified mobile device;
entering a finite state mode;
monitoring a location update state of the IMSI, the location update state comprising one of:
a location update normal state;
a location update IMSI attach state; and
a location update periodic state; and
identifying a location update state associated with the TMSI as matching a location update state associated with the IMSI.

18. The method as claimed in claim 17, comprising:
determining that the mobile device associated with the IMSI is still within the location area.

19. The method as claimed in claim 18, comprising:
applying a hidden markov model and bayesian filter to narrow the location area.

20. The method as claimed in claim 19, comprising:
storing IMSI location update state information;
probabilistically comparing TMSI location update state information with the stored IMSI location update state information; and
periodically monitoring the location of the identified mobile device by receiving periodic decode and capture messages for non-identified mobile devices from the base station.

* * * * *